United States Patent
Nangle et al.

(10) Patent No.: US 10,425,998 B2
(45) Date of Patent: Sep. 24, 2019

(54) HEAT GENERATOR

(71) Applicant: ROTAHEAT LIMITED, Salisbury (GB)

(72) Inventors: Douglas Nangle, Stratford upon Avon (GB); Andrew Tulloch, Berkshire (GB)

(73) Assignee: Rotaheat Limited, Salisbury (GB)

( * ) Notice: Subject to any disclaimer, the term of this patent is extended or adjusted under 35 U.S.C. 154(b) by 844 days.

(21) Appl. No.: 14/913,493

(22) PCT Filed: Aug. 18, 2014

(86) PCT No.: PCT/GB2014/052531
§ 371 (c)(1),
(2) Date: Feb. 22, 2016

(87) PCT Pub. No.: WO2015/025146
PCT Pub. Date: Feb. 26, 2015

(65) Prior Publication Data
US 2016/0212800 A1    Jul. 21, 2016

(30) Foreign Application Priority Data

Aug. 22, 2013  (GB) .................................. 1315019.8
Dec. 6, 2013   (GB) .................................. 1321540.5
May 6, 2014    (GB) .................................. 1407978.4

(51) Int. Cl.
*H05B 6/10*    (2006.01)
(52) U.S. Cl.
CPC ............. *H05B 6/108* (2013.01); *H05B 6/109* (2013.01); *Y02B 10/30* (2013.01)

(58) Field of Classification Search
CPC ........ H05B 6/108; H05B 6/109; H05B 6/105; H05B 6/017; H05B 6/10; Y02B 10/30; Y02B 10/40; Y02B 10/50; Y02B 10/70
See application file for complete search history.

(56) References Cited

U.S. PATENT DOCUMENTS 2,549,362 A  4/1951  Bessiere et al.
4,217,475 A  8/1980  Hagerty
(Continued)

FOREIGN PATENT DOCUMENTS

EP  0 077 702 A2  4/1983
EP  0 579 073 A   1/1994
(Continued)

OTHER PUBLICATIONS

International Search Report for PCT/GB2014/052531, dated Nov. 27, 2014, 2 pages.
(Continued)

*Primary Examiner* — David J Walczak
(74) *Attorney, Agent, or Firm* — Nixon & Vanderhye P.C.

(57) ABSTRACT

A heat generator comprises a fluid input and fluid output, an electrically conducting disc mounted on a shaft, a plurality of magnets with their N-S axis aligned parallel to the plane of the first disc are mounted either side of the disc, a plurality of runner vanes upstanding from the disc and forming a plurality of widening fluid paths towards the magnets and allow fluid to flow over a vane free portion of the disc to exit the heat generator though the output. Drive systems are described in which high pressure fluid from a hydraulic motor connected to a turbine or Archimedean screw is used to drive the disc.

20 Claims, 8 Drawing Sheets

(56) References Cited

U.S. PATENT DOCUMENTS

| | | | |
|---|---|---|---|
| 4,486,638 | A | 12/1984 | de Bennetot |
| 4,511,777 | A | 4/1985 | Gerard et al. |
| 5,012,060 | A | 4/1991 | Gerard et al. |
| 5,914,065 | A | 6/1999 | Alavi |
| 6,011,245 | A | 1/2000 | Bell et al. |
| 6,144,020 | A * | 11/2000 | Usui ............ B60H 1/22 219/631 |
| 6,297,484 | B1 | 10/2001 | Usui et al. |
| 6,325,298 | B1 * | 12/2001 | Hielm ............ F01P 3/20 219/628 |
| 6,489,598 | B1 | 12/2002 | Hiem |
| 9,883,552 | B2 | 1/2018 | Nangle |
| 2003/0066830 | A1 | 4/2003 | Reed et al. |
| 2005/0006381 | A1 | 1/2005 | Lunneborg et al. |
| 2013/0092681 | A1 | 4/2013 | Nangle |
| 2019/0053334 | A1 | 2/2019 | Tulloch et al. |

FOREIGN PATENT DOCUMENTS

| | | |
|---|---|---|
| EP | 1 130 336 | 9/2001 |
| GB | 2 336 751 A | 10/1999 |
| JP | 20000-123962 A | 4/2000 |
| WO | 97/46051 | 12/1997 |
| WO | WO 00/78569 A2 | 12/2000 |
| WO | WO 02/087285 | 10/2002 |
| WO | WO 02/087285 A1 | 10/2002 |
| WO | 2011/158030 A1 | 12/2011 |
| WO | 2014/167429 | 10/2014 |
| WO | 2015/025146 | 2/2015 |

OTHER PUBLICATIONS

English translation of JP 2000-123962 to Inoue, published Apr. 2000.
Notice of Allowance dated Sep. 27, 2017 in U.S. Appl. No. 13/704,844.
Quayle Action dated Jul. 18, 2017 in U.S. Appl. 13/704,844.
Advisory Action dated Aug. 24, 2016 in U.S. Appl. No. 13/704,844.
Advisory Action dated Jul. 7, 2016 in U.S. Appl. No. 13/704,844.
Final Office Action dated May 2, 2016 in U.S. Appl. No. 13/704,844.
Office Action dated Feb. 8, 2016 in U.S. Appl. No. 13/704,844.
Office Action dated May 27, 205 in U.S. Appl. No. 13/704,844.
International Search Report for PCT/GB2017/050369, dated May 15, 2017, 2 pages.

* cited by examiner

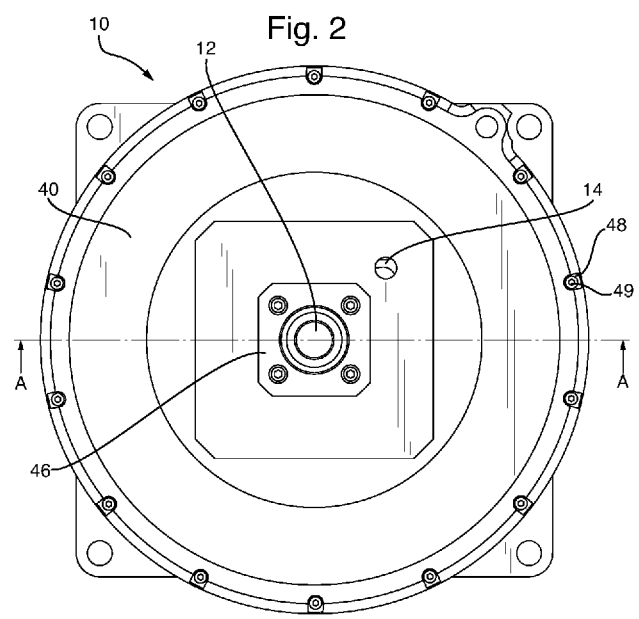
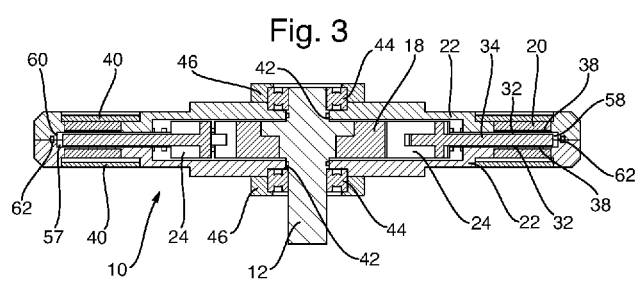

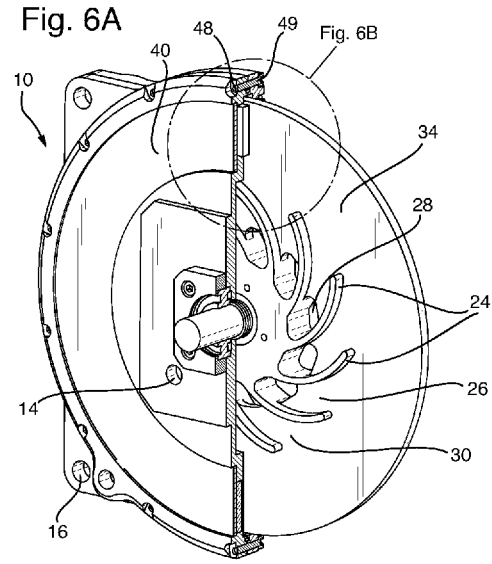
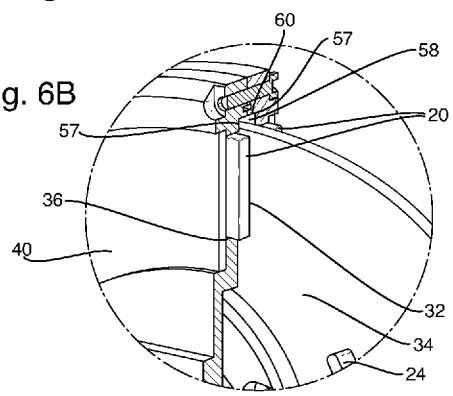

HEAT GENERATOR

This application is the U.S. national phase of International Application No. PCT/GB2014/052531 filed 18 Aug. 2014, which designated the U.S. and claims priority to GB Patent Application No. 1315019.8 filed 22 Aug. 2013, GB Patent Application No. 1321540.5 filed 6 Dec. 2013, and GB Patent Application No. 1407978.4 filed 6 May 2014, the entire contents of each of which are hereby incorporated by reference.

TECHNICAL FIELD

This invention relates to a heat generator.

BACKGROUND ART

PTL 0001: WO WO 2011/158030 A (CARBON ZERO LIMITED). 2011-06-15.

describes a heat generator comprising a magnetic field that is both rotatable about a shaft and intersects a heat exchanger that characterised in that the heat exchanger comprises a flat first disc that is both electrically conducting and is disposed around the shaft, but not attached thereto, said first disc having a fluid path in the plane of the disc wherein heat generated in the first disc by induction as a result of rotating the magnetic field is transferred to any fluid in the fluid path. The heat generator is usually driven by a wind turbine of the kind used to dive wind driven electricity generating systems turbine systems. Although it can by driven from a shaft connected to a water turbines or other power source.

In practice it has been found that heat generators as described in WO2011/158030 are heavy, requiring large diameter wind turbines to be effective and are unsuitable for smaller domestic heat generation systems. Furthermore there is a need for small hand operated heat generation systems for use in remote places or in emergency, where transport of a mast or availability of mast on which to mount a wind turbine to drive the heat generator is not practicable. Heat generators can also be used as emergency desalination plants, and it is a further issue that existing desalination plants are mainly used as large fixed installations, and the present invention will also provide an emergency desalination system.

Disclosure of Invention

According to the present invention a heat generator comprises a shaft connected to a source of power (not shown), a fluid input and fluid output, an electrically conducting first disc rigidly fixed to the shaft, a plurality of magnets with their N-S axis aligned parallel to the plane of the first disc are mounted either side of the first disc on a pair of second fixed discs mounted around the shaft but not coupled to it close to either side of the first disc and with the planes of the pair second discs parallel to the plane of the first disc, a plurality of runner vanes upstanding from one or both sides of the first disc and forming a plurality of fluid paths between the first and second discs from close to the shaft towards the magnets, widths of said paths increasing from their inlets close to the shaft to their outlets close to the magnets, a vane free portion of the first disc around the vanes and between the magnets, said outlets of the fluid paths arranged to allow fluid to flow over the vane free portion of the first disc to exit the heat generator though the output.

Ideally the runner vanes extend across half the diameter of each face of the first disc, and the vane free portion occupies the remaining parts of the faces of each disc.

In one embodiment fluid leaving the fluid paths created by the runner vanes passes into one or more channels between the magnets and the vane free portion of the first disc.

In such an embodiment the magnets may be in recesses set into the pair of second discs and separated from the said channel by thin portions of the pair of second discs.

In one arrangement of the foregoing, the second discs have grooves facing the vane free portions of the first discs, on the opposite face to the second discs to the faces containing the recesses in which the magnets are disposed, when seen in plan, said grooves being between the recesses.

In one arrangement the said channels discharge into a collector channel disposed in a circle around the recesses containing the magnets, but not connected thereto; the fluid leaving the heat generator through the outlet from the collector channel.

For cost effectiveness, the first disc with the runner vanes may be cast or machined from aluminium or aluminium alloy, other highly conducting materials such as copper or copper alloys could be used, but their costs are significantly higher. The second disc can be of steel or cast iron; but, for lightness, aluminium or aluminium alloy would be preferred.

Higher outputs can be obtained if two or more heat generators according to the invention are mounted back to back with their first discs driven from a common shaft. In one configuration the output of one generator is ducted to the input of the next generator in series. Fluid at different output temperatures may be obtained by having a number of outputs from the heater, whereby fluid is tapped which has had longer or shorter periods in the rotary heater.

The heat generator of the present invention can be made sufficiently small in size for the shaft to be turned manually. Turning the shaft manually for 7 or 8 minutes will generate enough hot water for a drink: this can provide a very useful emergency hot water generator for camper, trekkers, military personnel and others in remote areas.

By connecting the input to a sea water supply, and the shaft to an underwater propeller, the heat generator of the present invention can serve as an emergency de-salination unit by vaporising the sea water and condensing the output.

In a particular embodiment for desalination purposes a propeller or water or wind turbine drives a pump generating high pressure hydraulic fluid which is passed into input of a rotary heater of the present invention, the fluid is heated in the heater and the output of the heater to a heat exchanger to evaporate sea water, the hydraulic fluid to returned directly to the pump.

Situations may arise where the heat generators described above and other known heat generators used for commercial or domestic heating systems are place some distance from a building or other place in which the heat is to be used. This would require heated fluid (most likely water or oil) to be piped over that distance. Even if the piping is very well insulated, substantial losses of heat can arise, reducing the overall thermal efficiency of the system.

For maximum efficiency, the rotational speed of a rotary heat generator of the kind described herein, say around 300 rpm for a 3 kW generator, is not well matched to the ideal rotational speeds of larger wind and water turbines, which are often one tenth of this figure. This mismatch can only currently be overcome by expensive gear mechanisms or limiting the diameter of the turbine.

In a further aspect of the invention a rotary heat generator is driven by a hydraulic motor supplied with high pressure fluid. Such a drive system could be used with rotary heat systems of all kinds, whether or not specifically a rotary heat system as described in para [0004].

In addition to the thermal advantages, this embodiment:
avoids the need for expensive gear trains to match the ideal rotational speed of a wind or water turbine to the ideal rotational speed of the rotary heat generator;
is an efficient way to transfer the turbine's work over longer distances, reducing heat loss that can arise with heat generation near the turbine and taking the heat to the point of use;
it can provide braking for a wind turbine, without a separate braking mechanism on the turbine. This would prevent over-rotation of the turbine without out the need for an alternative braking mechanism significantly reducing the cost of the turbine itself.

The high pressure hydraulic fluid may be generated from the output of a turbine, or an Archimedean screw, water wheel or propeller. The turbine may be a wind or water turbine.

In one arrangement the high pressure fluid is generated by a hydraulic pump driven from a wind or water turbine or Archimedean screw, water wheel or propeller.

In such an arrangement the high pressure fluid generated by the pump could supply the high pressure side of a hydraulic motor driving the shaft of the rotary heat generator; the output of the motor is returned to the low pressure side of the pump thus forming a closed loop hydraulic system. In some embodiments the high pressure fluid generated by the pump is coupled to the input of the heater and the output of the heater connects through a heat exchange system to the low pressure side of the pump.

In a further development the hydraulic motor is formed integrally with a rotating disc of a rotary heat generator, with edges of the disc intersecting the magnetic field vanes to generate heat.

Ina still further development the hydraulic fluid pumped by the hydraulic pump can be used as the working fluid of the heater by connecting the high pressure line from the hydraulic pump to the inlet of the rotary heater, heating the hydraulic fluid in the rotary heater, subsequently extracting the heat from the rotary heater and returning the fluid to the hydraulic pump by a low pressure line.

By using high pressure connections to the source of power to drive the rotary heat generator, the rotary heat generator can be placed close to the place of use of heat, minimising the heat losses in transporting the heat from the generator to the place of use.

In a still further aspect of a rotary heat generator rotated using with high pressure fluid generated by a wind turbine driving a hydraulic pump is that the rotary heat generator acts as a brake for the wind turbine, avoiding the need of an over-speed brake on the wind turbine.

In a further arrangement the hydraulic motor and rotary heat generator are mounted in a water tank to be heated for storage and supply source of hot water for a building or other facility; in this way transmission losses are minimised. In this embodiment it is possible to redesign the heater such that the magnets are covered and the second disc(s) are mounted on the shaft and the first disc is fixed, optionally too the runner vanes can be omitted so that fluid passes freely over the first disc which is heated but rotation of the second disc: this embodiment is less efficient than the first embodiment if the body of the device were immersed in water it may be a practical option.

Small frictional losses occur in the transmission of hydraulic fluid from a hydraulic pump to the rotary heat generators, but these losses are substantially less than the heat losses that would occur if the heat generator was placed to connect with the output shaft of a turbine, and the heat generated by the heat generator transported in insulated pipes over the same distance.

In open systems water is conveniently the hydraulic fluid. For closed loop systems oils, refrigerants, and water rust inhibitors and anti-freezing compounds might be used. In closed loop systems, when heat is not need to heat premises, the heat generated from the system can be fed to a Stirling engine or other device to generate electricity.

BRIEF DESCRIPTION OF DRAWINGS

The invention will now be described, by way of example only, with reference to the accompanying drawings, in which:

FIG. 2 an end-on view of the heat generator of FIG. 1;

FIG. 3 is a section on the line A-A of FIG. 2;

FIG. 6A is the same as FIG. 1 but with a portion marked to show further detail as FIG. 6B;

FIG. 6B is a detail view of part of the heat generator;

DETAILED DESCRIPTION OF EXAMPLES OF THE INVENTION

Figure 1:
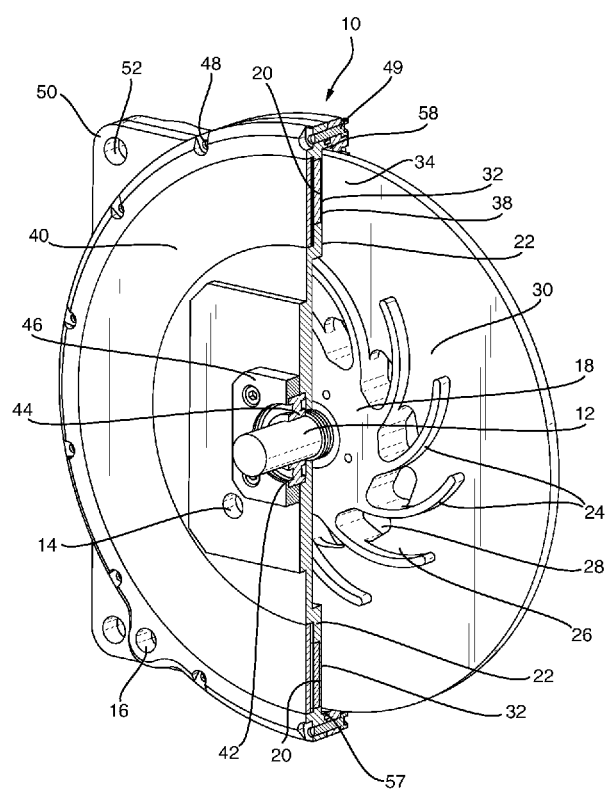
FIG. 1 is a partial section through a heat generator according to the invention.
Figure 4:
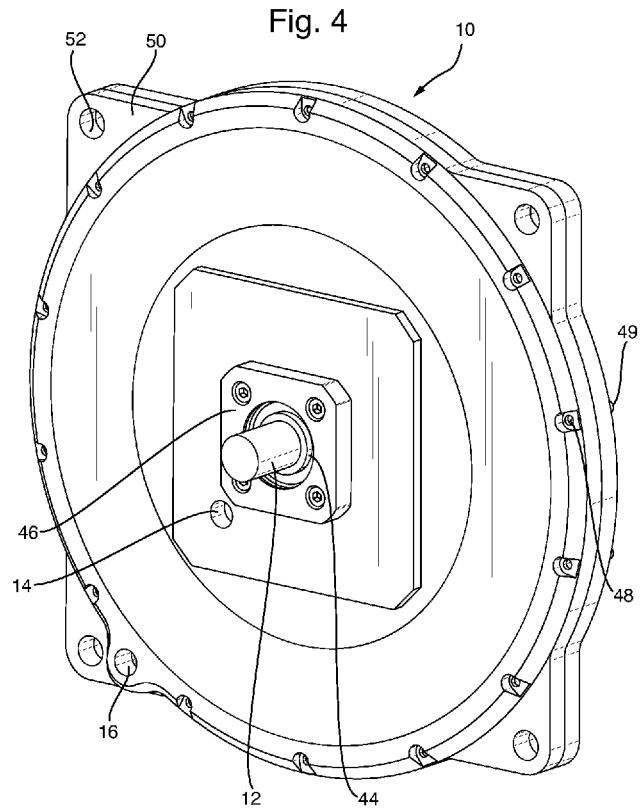
FIG. 4 is a perspective view of the heat generator of FIGS. 1, 2 and 3; second disc isolated from the heat generator.
Figure 5:
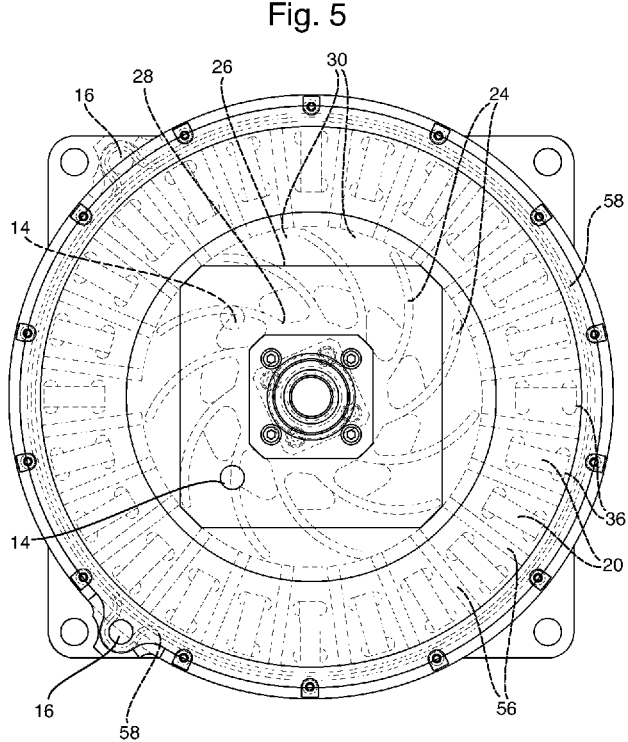
FIG. 5 is a same as FIG. 2 with the case removed to show detail beneath.

In FIGS. 1 to 6 a heat generator 10 comprises a shaft 12 (only partially shown) connected to a source of power, a fluid input 14 and fluid output 16. A first disc 18 comprising aluminium is mounted rigidly on the shaft 12. A plurality of magnets 20 parallel to the plane of the first disc 18 are mounted either side of it. A pair of second fixed discs 22 are mounted around the shaft but not coupled to it, close to and either side of the first disc 18; the planes of the second discs 22 are parallel to the first disc 18. A plurality of runner vanes are 24 cast as part of the first disc 18, upstanding up from the surface of the first disc on both sides thereof and forming a plurality paths 26 between the first and second discs 18 and 22 from close to the shaft 12 towards the magnets 20. The magnets are aligned with their NS axis lying radially to the pairs of second discs with one pole, say S, pointing to the centre of the second disc. The widths of said paths 26 increase from their inlets 28 close to the shaft to their outlets 30 close to the magnets 20. The fluid input 14 to the heat generator passes through one of the pair of second discs and links with an inlet 28 causing water to flow the associated path 26. As disc 18 turns with the shaft 12, the water will be moved centrifugally outwards through the path 26. Each of the inlets 28 in turn passes by input 14 causing water to enter each of the paths 26. The water will flow out of outlets 30 into a thin passage 32 passing between the magnets and the vane free outer portion 34 of first disc 18.

The magnets are mounted in recesses 36 towards the periphery of the second disc, with thin pieces 38 of the second disc between the magnets and passage 32 to prevent contact between the magnets and the water flowing in passage 32. The magnets are held in place in the recesses 36 by covers 40 over the recesses 36 in each of the two second discs 22

The second discs 22 have central holes 42 through which the shaft 12 passes.

Bearings 44 are inset into second discs 22, around the central holes 42 held in place by keeper plates 46. The bearings 44 support the shaft 12 and allow it to turn with respect to the second discs 22. A plurality of bolts 48 in holes 49 around the outer edges of the pair of second discs 22, hold the pair of second discs in place around the first disc 18, allowing the first disc 18 freely to rotate between the two second discs, with its vane free portion 34 rotating within the fields created by the magnets 20.

The outer rim of each of the pairs of second discs 22 have "ears" 50 through which holes 52 pass, enabling the heat generators to be mounted in a frame or on a support. These "ears" 50 and holes 52 are not necessary in a small hand operated heat generators.

To assist good distribution of water over the vane free portion 34 of first disc 18, radial grooves 56 (see FIG. 5) are provided in the inner surfaces of the pair of second discs 22, on the opposite sides of the discs from the recesses 36, the latter when seen in plan (FIG. 5) are positioned between the recesses.

A circular channel 57 cut into the inner surfaces of the pair of second discs extends around the outside of the recesses 36 and radial grooves 56, but connected to neither. Around the outside of each channel 57 is an upstanding circular lip 60 (see FIG. 6B). When the pair of second discs are assembled to together the two corresponding lips 60 mated, with a recess containing receiving a gasket 62 between them and seal the heat generator. The circular channels 57 combine to form a single collection channel 58, to conduct fluid traveling out of the passage 32 to the output 16, from where fluid leaves the heat generator.

In operation, the shaft 12 is connected to a power source, such as a wind turbine, could be a hand operated handle in a small unit, or an underwater propeller for a de-salination unit. The input 14 is connected to a source of water. Turning the shaft causes the fluid to be move centrifugally and be pushed by runner vanes 24 to the vane free portion 34 of first disc 18, into thin passage(s) 32 and grooves 56. Turning disc 18 between the magnets 20 causes currents to be generated in the first disc 18, particularly in the vane free portion 34 thereof and for the first disc 18 to heat again particularly the vane free portion 34; this in turn heats the fluid in thin passage(s) 32 which then passes into collector channel 58 and out of the heat generator through output 16. By controlling the rate at which fluid enters the heat generator, it is possible to increase or decrease the temperature of the fluid leaving the output, by slowing the flow sufficiently it is possible to vaporise the water before it leaves the output 16, so allowing the device to act as a desalination unit.

The unit is can be conveniently sized, a unit suitable to generate 3 kW would be about 260 cm in diameter, driven by a 3 meter wind turbine; a large 10 kW would require a 10 m wind turbine. A small unit for personal operation would generate enough hot water for a drink with about 7 or 8 minute hand turning of the shaft.

If necessary a heat generating system with a higher output can be obtained if two or more heat generators according to the invention are mounted back to back with their first discs driven from a common shaft. In one configuration the output of one generator in connected to and provides the input 14 of the next generator in series.

Multiple outlets 16 can be provided. If say, two are used, one spaced from the other by a quarter of the distance around the periphery of the heat generator, two different temperature outlets can be provided as the dwell time of fluid in the heat penetrator will be different at each outlet.

The outside of the heat generator would normally be lagged to minimise heat loss. The heat generator was supplying a heating coil of a hot water tank, pipework to and from the heat generator would need to be lagged, and the system pressurised to ensure water or other fluid was always present in the heat generator. For other applications, the fluid supply would need to be under some pressure, for example from a header tank, for the heat generator to be primed with water before use to ensure the presence of fluid in the system; if a header tank is not available a small priming pump may be needed to pump fluid into the heat generator initially.

Often a heat generator as described in FIGS. 1 to 6 would use water as the operating fluid, but other fluids can be used if specific performance was needed, or in closed loop systems. The output, when water, can be used directly. The output when the fluid is water or another fluid can be taken a heat exchanger or the heating coil of hot water tank and used for indirect heating purposes. Other possible arrangements are also described in the following paragraphs.

Figure 7:
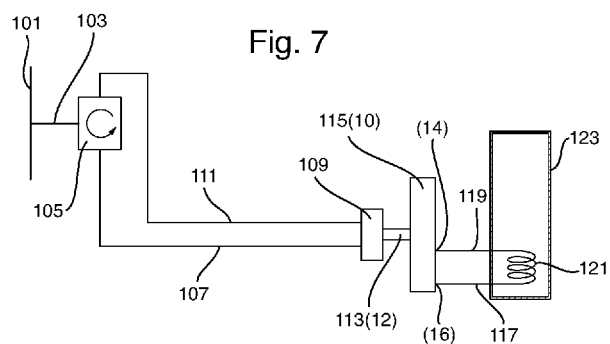
FIG. 7 shows schematically a first arrangement of a rotary heat generation system according to the present invention.

In FIG. 7 shows a rotary heat generator schematically connected to a turbine. As all the individual components of the rotary heat generator are described with respect to FIGS. 1 to 6 above and turbines are known, the individual components are not described again in detail.

A turbine, which may be a water or wind turbine 101 has its output shaft 103 connected to a hydraulic pump 105. The high pressure output 107 is connect to the high pressure input of a hydraulic motor 109, the low pressure output of the hydraulic motor 109 is connected to the low pressure input of hydraulic pump 105 through low pressure line 111.

The output shaft 113 of hydraulic motor 109 drives a rotary heat generator 115 of the kind described in FIGS. 1 to 6. In that case, shaft 113 is the same shaft as shaft 12 in FIGS. 1 to 6.

The high temperature line 117 from the output (16 in FIGS. 1 to 6) of rotary heat generator 115 is connected to heating coil 121 of a hot water tank 123, the low temperature return 119 being connected to the input 14 shown in FIGS. 1 to 6.

Figure 8:
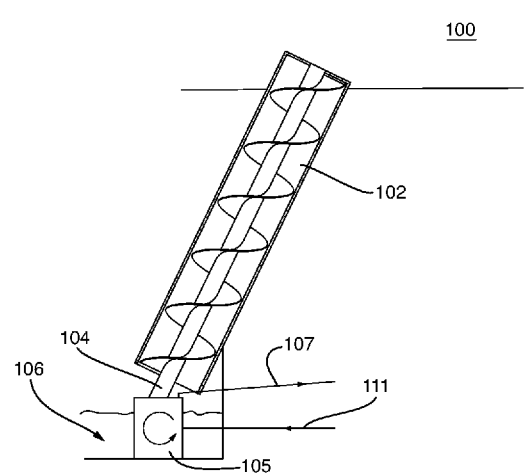
FIG. 8 shows a second arrangement of a rotary heat generation system according to the present invention.

In FIG. 8, the turbine 101 of FIG. 7 is replaced by an Archimedean screw 102 mounted between one water channel 100 and a second lower channel 106. Water falling by gravity through the screw, turns the screw which is connected through its output shaft 104 to hydraulic pump 105. This pump 105 is connected as in FIG. 7 through high pressure and low pressure hydraulic lines to a hydraulic motor connected to the shaft of a rotary heat generator as discussed in FIG. 7.

As an alternative to the arrangement in FIG. 8, the Archimedean screw is mounted in a fast flow channel rather than between two channels, water passing through the screw turning the screw. As a further variation the Archimedean screw is mounted below the water line of a yacht or other vessel, movement of the yacht or vessel turning the screw. Such an arrangement would provide excellent results, if for example the screw was mounted in a tidal channel.

In the description in the preceding paragraphs, the Archimedean screw may be replaced by a water wheel, a propeller or a water turbine.

Figure 9:
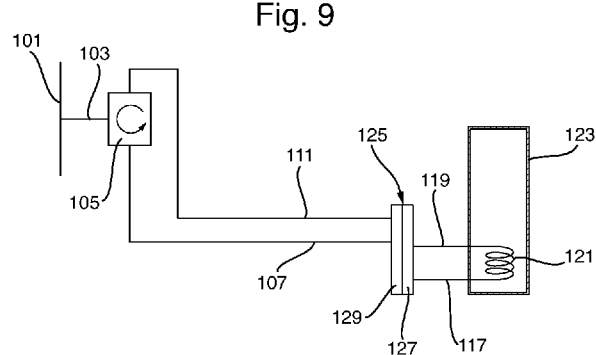
FIG. 9 shows a third arrangement of a rotary heat generation system with the hydraulic motor combined with the rotating disc of FIGS. 1 to 6.

In FIG. 9, a turbine, which may be a water or wind turbine 101 has its output shaft 103 connected to a hydraulic pump 105. The high pressure output 107 is connected to a combined hydraulic motor and rotary heat generator 127. The combined hydraulic motor and rotary heat generator can be constructed in a similar way to the device shown in FIGS. 1 to 6, save that the two sides of the first disc 18 are isolated from one another with no fluid connection between them. One side 129 forms a hydraulic motor, the other side 127 the heat generator. On the side 129 forming the hydraulic motor, the output to low pressure line 111 is taken between the outer edges of vanes 24 and magnets 20 and an independent high pressure input is provided to the feet of vanes 24 from the high pressure line 107.

Hydraulic fluid passing between high pressure line 107 to low pressure line 111 turns the rotary heat generator causing the periphery of first disc 18 to intersect the magnetic flux brought about by magnets 20. Fluid passing over the periphery of the first disc 18 on the heat generating side 127 of the combined device drives hot fluid into the high temperature line 117 from its output thus to heating coil 121 of a hot water tank 123, the low temperature return 119 being connected to the input of the rotary heat generation side of the combined device 125.

Figure 10:
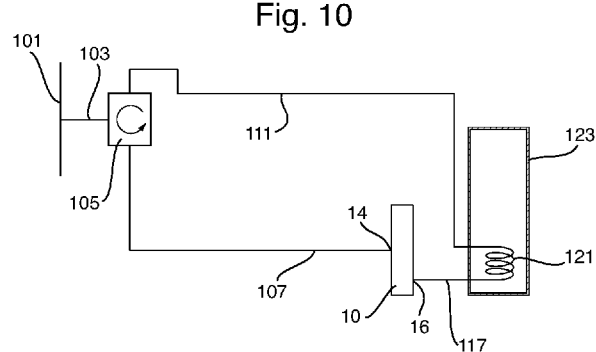
FIG. 10 shows an arrangement of a rotary heat generation system with the rotary heat generator and an associated hydraulic motor immersed in a hot water tank.

In a further development shown in FIG. 10, the high pressure line 107 is connected directly to the input 14 of the rotary heat generator 10 as shown in FIGS. 1 to 6 and hydraulic fluid from the high pressure line passes through the passages 26 of rotating disc 18, causing its periphery to cut the magnetic fields created by magnets 20 in FIGS. 1 to 6. The fluid is heated and deployed for example, by passing hot fluid from output 16 into a high temperature line 117 into a heating coil 121 of tank 123, it is then returned directly via the low pressure line 111 to hydraulic pump 105. In this particular configuration with an entirely closed loop system the hydraulic fluid is conveniently oil, which can also be used to lubricate the bearings in the rotary heat generator during its passage through the rotary heat generator. Although shown with a coil 121 heating a tank 123, heat take off is conveniently via any form of heat exchanger place in the circuit between output 16 and low pressure line 111. In this configuration the passage of hydraulic fluid though paths 26 (seen in FIGS. 1 to 6), causes the rotary heater itself to rotate, with the discs 18 to intersect the magnetic fields generated by the magnets 20, heating the fluids as before.

The configuration of FIG. 10 is particularly but not exclusively useful for desalination units where a propeller or water or wind turbine 101 drives a hydraulic pump 105 generating high pressure hydraulic fluid into input 14 of a rotary heater 10 the present invention, the fluid is heated in the heater 10 and the output 16 of the heater is passed to a heat exchanger to evaporate sea water, the hydraulic fluid to returned directly to the pump.

Figure 11:
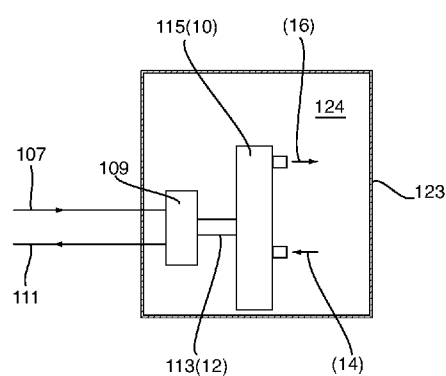
FIG. 11 shows an arrangement of a hydraulic motor driving shaft connected to a rotary heat generator mounted together in a water tank supplying hot water to a building or other facility.

In FIG. 11, a hydraulic motor 109 driving a shaft 113 connected to a rotary heat generator 115 are mounted together in a water tank 123 supplying hot water to a building or other facility. High pressure hydraulic fluid supply line 107 from a hydraulic pump is connected through the walls of the tank to the high pressure side of hydraulic motor 10, low pressure hydraulic return line 111 is connected through the wall of the tank to the low pressure side of the hydraulic pump.

The system of FIG. 10 works in an exactly analogous way to the systems of FIGS. 7 and 8 with a wind or water turbine or Archimedean screw driving a hydraulic pump supplying high pressure fluid to line 107. However, in this case rather than the input and output of rotary heat generator being connected to low and high temperature supply lines respectively, they simply output high temperature water through output (16 in FIGS. 1 to 6), input water from the tank through the input (14 in FIGS. 1 to 6).

The configuration of FIG. 10 is useful for desalination units where a propeller or water or wind turbine 101 drives a hydraulic pump 105 generating high pressure hydraulic fluid into input 14 of a rotary heater 10 the present invention, the fluid is heated in the heater 10 and the output 16 of the heater is passed to a heat exchanger to evaporate sea water, the hydraulic fluid to returned directly to the pump.

Other drives for the hydraulic pumps and arrangements for hydraulically driving the rotary heat generator will be apparent to those skilled in the invention without departing from the basic concept underlying this invention.

Situations will arise when heat output is not required from the system. In this case the hydraulic motor 109 may be switched to drive an electrical generator instead.

In another option when direct heat output is not required from the heat generator 10, heat generated by the generator 10 is fed to a Stirling engine of other device to generate electricity.

The invention claimed is:

1. A heat generator comprising:
   a shaft,
   a fluid input and fluid output,
   an electrically conducting first disc rigidly fixed to the shaft and rotating when the shaft rotates,
   a plurality of magnets having their magnetic fields intersecting the plane of the first disc mounted either side of the first disc on a pair of second fixed discs mounted around the shaft, but not coupled to it either side of the first disc and with the planes of the pair of second discs parallel to the plane of the first disc,
   a plurality of runner vanes upstanding from one or both sides of the first disc and forming a plurality of fluid paths between the first and second discs from close to the shaft towards the magnets, the each path having an inlet close to the shaft and an outlet close to the magnets, the widths of said paths increasing from each of their inlets to each of their outlets,
   a vane free portion of the first disc between the magnets on the pairs of second fixed discs,
   said outlets of the fluid paths arranged to allow fluid to flow over the vane free portion of the first disc to exit the heat generator though the output.

2. A heat generator according to claim 1 in which the runner vanes extend across half the diameter of each face of the first disc, and the vane free portion occupies the remaining part of the first disc.

3. A heat generator according to claim 1 having a fluid passage between the magnets and the vane free portion of the first disc.

4. A heat generator according to claim 3 in which the magnets are in recesses set into the pair of second discs.

5. A heat generator according to claim 4 in which each second disc has opposed faces, one face facing the vane free portion of the first disc, with grooves on the said face of the second disc facing the vane free portion of the first disc and the other face of each second disc having recesses in which the magnets are disposed, and, when seen in plan, said grooves being between the recesses.

6. A heat generator according to claim 1 having a collector channel disposed in a circle outside the first disc and connected to the fluid outlet whereby fluid passing over the vane free portion of the first disc is collected in the collector channel and exits the heat generator through the fluid output.

7. A heat generator comprising a plurality of heat generators each according to claim 1.

8. A heat generator according claim 7 being one of a plurality of such heat generators mounted on the same shaft.

9. A heat generator according to claim 8 in which the output of the heat generator is connected to the input of another such heat generator.

10. A heat generator according to claim 1 additionally comprising a hydraulic pump, a high pressure line connecting to an inlet of the heat generator and a low pressure line returning hydraulic fluid to the hydraulic pump after passing through the heat generator and after the generated heat has been used.

11. A heat generator according to claim 1 additionally comprising a hydraulic motor supplied with high pressure fluid to rotate the first disc.

12. A heat generator according to claim 11 in which the hydraulic motor is formed integrally with the first disc.

13. A heat generator according to claim 12 wherein the high-pressure fluid is supplied to the hydraulic motor from a hydraulic pump connected to a wind turbine and wherein the heat generator provides an over-speed control mechanism of the wind pump.

14. A heat generator according to claim 12 in which the hydraulic motor and heat generator are mounted in a water tank to be heated for storage and supply of hot water to a building or other facility.

15. A heat generator comprising
   a. a shaft;
   b. a fluid input and fluid output, an electrically conducting first disc rigidly fixed to the shaft and rotating when the shaft rotates;
   c. a plurality of magnets having their magnetic fields intersecting the plane of the first disc mounted either side of the first disc on a pair of second fixed discs mounted the shaft, but not coupled to it either side of the first disc and with the planes of the pair of second discs parallel to the plane of the first disc;
   d. a plurality of runner vanes upstanding from one or both sides of the first disc and forming a plurality of fluid paths between the first and second discs from close to the shaft towards the magnets, the each path having an inlet close to the shaft and an outlet the outlet close to the magnets, the widths of said paths increasing from each of their inlets to each of their outlets;
   e. a vane free portion of the first disc between the magnets on the pairs of second fixed discs, said outlets of the fluid paths arranged to allow fluid to flow over the vane free portion of the first disc to exit the heat generator though the output;
   f. the runner vanes extending across half the diameter of each face of the first disc, and the vane free portion occupies the remaining part of the first disc;
   g. a fluid passage between the magnets and the vane free portion of the first disc;
   h. recesses set into the pair of second discs containing the magnets.

16. A heat generator according to claim 15 in which each second disc has opposed faces, one face being the vane free portion of the first disc, with grooves on the said face of the second disc facing the vane free portion of the first disc and the other face each second disc having recesses in which the magnets are disposed, and, when seen in plan, said grooves being between the recesses.

17. A heat generator according to claim 15 having a collector channel disposed in a circle outside the first disc and connected to the fluid outlet whereby fluid passing over the vane free portion of the first disc is collected in the collector channel and exits the heat generator through the fluid output.

18. A heat generator according to claim 15 additionally comprising a hydraulic motor supplied with high pressure fluid to rotate the first disc.

19. A heat generator according to claim 18 in which the hydraulic motor is formed integrally with the first disc.

20. A heat generator comprising:
   a shaft;
   a fluid input and fluid output;
   an electrically conducting first disc rigidly fixed to the shaft and rotating when the shaft rotates:
   a pair of second fixed discs mounted around but not coupled to the shaft;
   a plurality of magnets mounted on the second discs, the plurality of magnets having magnetic fields intersecting a plane of the first disc, planes of the pair of second fixed discs being parallel to the plane of the first disc,
   a plurality of runner vanes upstanding from one or both sides of the first disc and forming a plurality of fluid paths between the first disc and the pair of second fixed discs, the plurality of fluid paths extending from close to the shaft towards the magnets, the fluid paths each comprising an inlet close to the shaft and an outlet close to the magnets, the widths of each of said fluid paths increasing from the inlet to of the outlet;
   a vane free portion of the first disc being provided between the magnets on the pairs of second fixed discs,
   said outlets of the fluid paths arranged to allow fluid to flow over the vane free portion of the first disc and to exit the heat generator though the output.

* * * * *